July 7, 1964

A. M. MAROTH 3,139,772

MECHANICAL TRANSMISSION

Filed May 3, 1963

INVENTOR.
ARTHUR M. MAROTH
BY

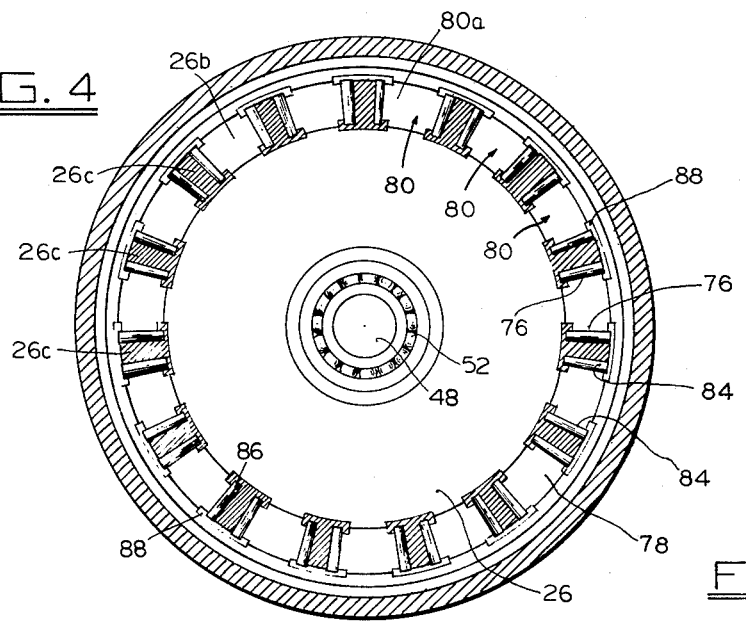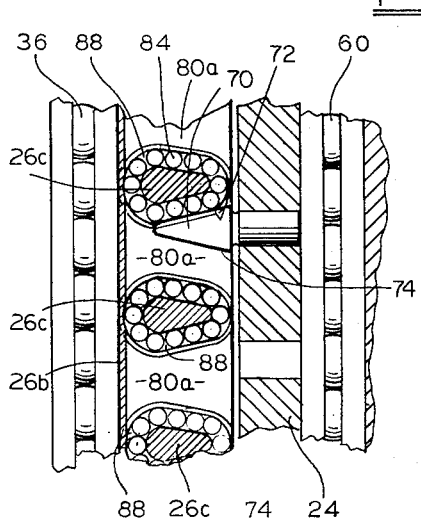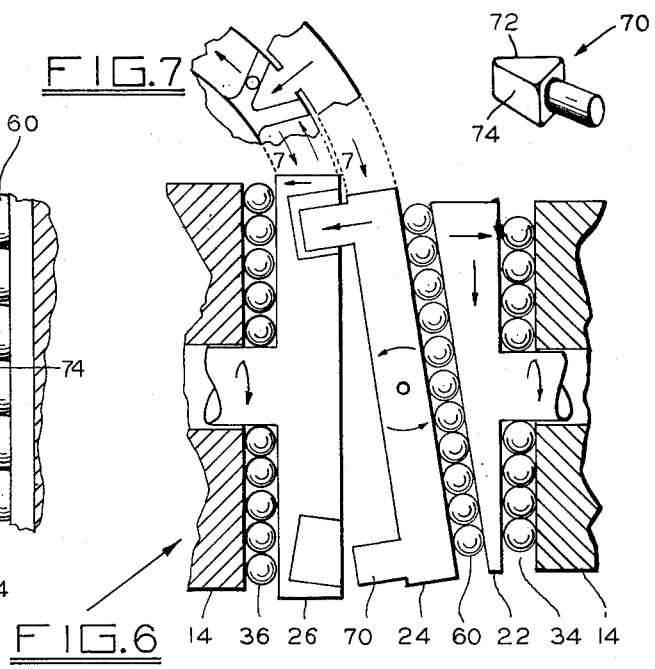

United States Patent Office 3,139,772
Patented July 7, 1964

3,139,772
MECHANICAL TRANSMISSION
Arthur M. Maroth, % Maroth Engineering Co., Grumman Hill Road, Wilton, Conn.
Filed May 3, 1963, Ser. No. 285,171
9 Claims. (Cl. 74—800)

This invention relates to mechanical transmissions, and more particularly to gearless transmissions of the type providing a speed reduction.

The present application is a continuation-in-part of my copending application Serial No. 89,486, filed February 15, 1961, now abandoned, and entitled "Mechanical Transmission."

An object of the invention is to provide a novel and improved speed-reducing transmission of the type providing a positive drive, which transmission is characterized by very low losses and therefore high efficiency.

Another object of the invention is to provide an improved mechanical transmission as above set forth, which has a large ratio of speeds between the input and output shafts, whereby a relatively great speed reduction is had.

Still another object of the invention is to provide an improved mechanical transmission in accordance with the foregoing, which is especially adapted to a high input shaft speed or r.p.m.

Features of the invention reside in the provision of an improved mechanical transmission as characterized, which has a minimum number of main moving parts and is of relatively small size being further characterized by lightness of weight, low initial or fabrication cost and up-keep or maintenance, and which additionally is especially compact in its construction.

A further feature of the invention resides in the provision of a novel gearless mechanical transmission as outlined above, which is essentially symmetrical with respect to a pair of aligned input and output shafts, and wherein the transmission itself may constitute a speed-change coupling insertable as a unit in a rotary transmission line so as to effect a relatively great reduction in speed at one part of the line as compared with the other or input part.

Other features of the invention reside in the provision of an improved mechanical transmission wherein appreciable power and capacity is had while utilizing parts of relatively small size, without the likelihood of failure, and a transmission of this kind wherein frictional forces are greatly reduced, with sliding friction held to a minimum and confined to those points which are not depended on to carry the heaviest forces or load.

An important specific object is to provide a transmission of the wobble-plate or nutating type, wherein great accuracy of movement of the wobble plate is had, and great load capacity with relatively light structures.

Other features and advantages will hereinafter appear.

In the drawings accompanying this specification, similar characters of reference are used to designate like components throughout the several views, in which:

FIG. 4 is a transverse sectional view taken on the line 4—4 of FIG. 1.

FIG. 5 is a fragmentary sectional view taken on the line 5—5 of FIG. 1.

FIG. 6 is a diagrammatic representation of the transmission illustrating the various forces involved in transmitting the power.

FIG. 7 is a fragmentary diagrammatic representation of two components represented in FIG. 6, looking in the direction of the arrows 7,7 in FIG. 6.

FIG. 8 is a perspective view of one of the driving wedge members employed in the transmission.

Figure 1:
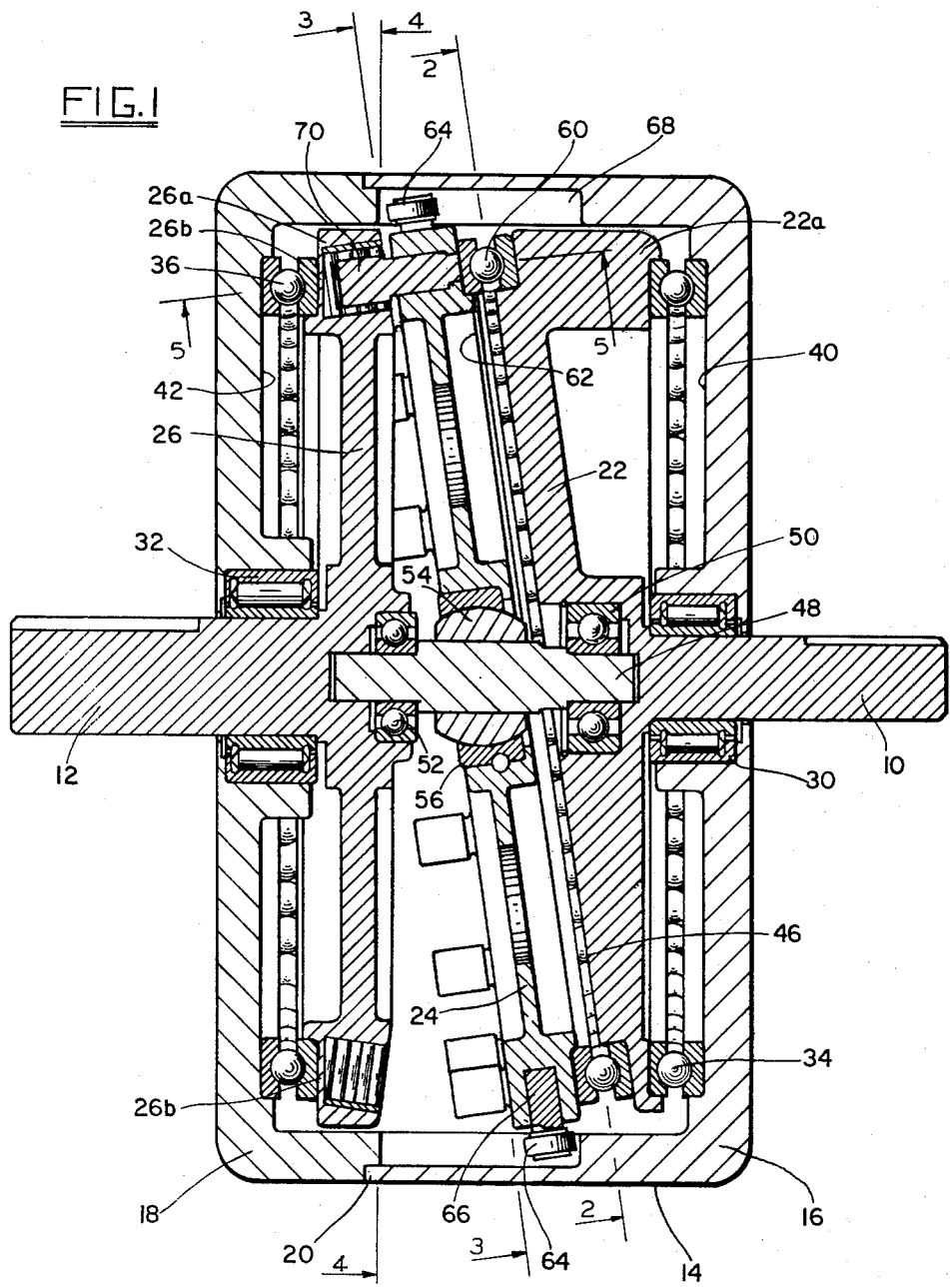
FIGURE 1 is an axial sectional view of the improved mechanical transmission as provided by the invention.

Considering first FIG. 1, the transmission as shown comprises rotary input and output shafts 10 and 12 respectively, the said shafts being shown as in alignment with each other and being carried by a circular or annular type casing 14 which in the present instance is stationary and may be secured or anchored against rotation in any desired manner.

The casing 14 may comprise two separate sections 16 and 18 having an interfitting or telescoping connection 20, constructed in a usual manner.

The novel transmission of the present invention, which is wholly contained within the casing 14, is characterized by a high degree of simplicity, and essentially involves relatively few, main moving parts. Specifically, within the casing there is a rotary driving member 22 which is herein termed on "actuating" member, an intermediary non-rotary or non-turntable, wobble or driving member 24, and a second rotary member 26 which constitutes the driven member, the members 22 and 26 being respectively carried by and rigidly affixed to the input and output shafts 10, 12.

Suitable bearings are respectively provided for the shafts 10 and 12, such bearings being shown as anti-friction roller bearings 30 and 32. The invention further provides, as an important feature, large-diameter, anti-friction thrust bearings 34 and 36, which are connected with the outer peripheral portions 22a and 26a respectively of the actuating and driven members 22 and 26, and are also connected or engaged with interior end thrust surfaces 40 and 42 respectively of the casing sections 16 and 18. The member 22 provides great accuracy in the movements of the member 24 and imparts great strength thereto, by acting as a direct-action load carrier which supplies a mostly-compressible backing for the member 24, or compression member between the thrust surface 40 and member 24. Smaller sections may thus carry heavier loads, in the wobble movement. The anti-friction bearings 34 and 36 are shown as thrust ball bearings, and may be of any suitable type, such bearings being capable of handling appreciable thrust forces between the actuating and driven members 22, 26 and the casing 14, without appreciable friction or losses.

In accordance with the present invention, the actuating member 22 is provided with a sloping driving face 46 making an angle with respect to the axis of the member and shaft 10, such axis being common with the axis of the driven shaft 12 and driven member 26 as will be understood. The sloping driving face 46 of the actuating member 22 is adapted for engagement with the non-turing or non-rotary drive member 24 and, in conjunction with a universal type bearing means provided at the center of the drive member 24, imparts an orderly cyclic wobbly motion to the drive member.

The universal type bearing means provided at the center of the drive member 24 may comprise a stub shaft 48 carried by anti-friction bearings 50 and 52 located respectively at the inner ends of the driving and driven shafts 10 and 12 and at the centers of the actuating and driven members or wheels 22, 26. The stub shaft 48 is provided with a spherical bearing 54 which is disposed within an annular bearing collar 56 affixed in the bore of the non-rotary driving member 24. The mounting provided by the stub shaft 48 and spherical bearing 54 enables the driving member 24 to have somewhat of a universal tilting movement, while preventing appreciable axial translational movement of the member.

Thus, upon rotation of the input shaft 10 and actuating member 22 the engagement between the driving face 46 of the member and a cooperable face on the drive member 24 will effect a wobbly motion of such drive member, which is herein termed on "orderly cyclic wobbly motion." That is, upon the actuating member 22 turning, the drive member 24 will be tilted in an orderly, progressive fashion which may be considered as somewhat of a rotary nature, even though the drive member does not actually turn. However, any point upon the periphery of the drive member 24 will have an oscillating substantially axial motion, and will move back and forth or from left to right and vice versa as viewed in FIG. 1.

For the purpose of reducing friction, a large diameter anti-friction thrust ball bearing assembly 60 is provided between the driving face 46 of the actuating member 22 and the cooperable end face 62 of the drive member 24.

Figure 2:
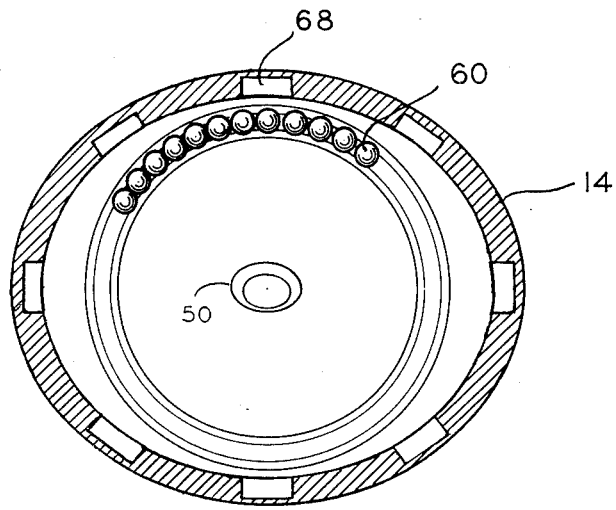
FIG. 2 is a transverse sectional view taken on the line 2—2 of FIG. 1.
Figure 3:
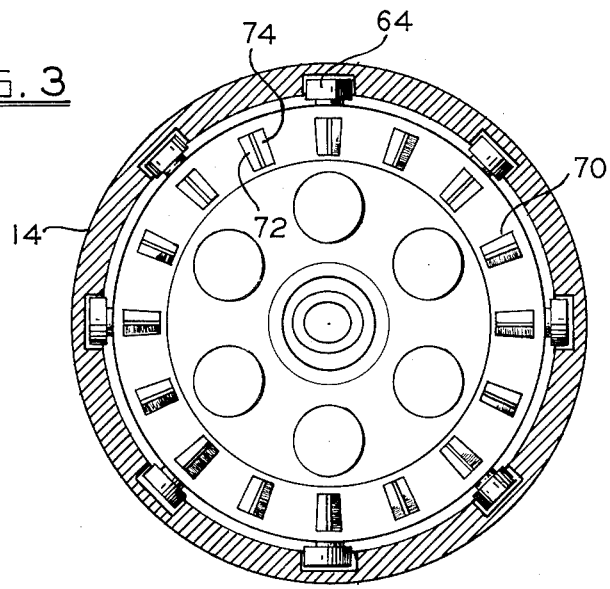
FIG. 3 is a transverse sectional view taken on the line 3—3 of FIG. 1.

In order to prevent turning movement of the drive member 24 while involving a minimum of friction and retardation of the wobbly motion thereof, the said member is provided with a plurality of rollers 64 carried by shafts 66 disposed radially in the outer peripheral portion of the member 24. The rollers 64 are received in longitudinally extending guide slots 68 disposed in the interior of the casing 14 and arranged in a circle. As seen in FIGS. 2 and 3, a total of eight such slots, and eight rollers 64 are provided. However, either a greater or lesser number may be utilized, as will be understood.

Further, in accordance with the invention, the cyclic wobbly motion of the drive member 24 is utilized to impart a non-stepped or continuous rotary advancing movement to the driven member or wheel 26. In effecting this, the drive member 24 is provided with a plurality of driving parts, lugs or wedges 70, which are disposed in the front end face of the drive member and which extend generally axially thereof, the said wedges being separated by spaces, being disposed in a circle and having oppositely located sloping driving faces 72 and 74. Any suitable number of wedges 70 may be employed. As seen in FIG. 3 a total of sixteen such wedges is shown. FIGURE 8 is a perspective view of one of the wedges 70.

Further, in accordance with the invention, the driven member or wheel 26 is provided with parts comprising cooperable or engageable faces 76 arranged to experience force from the driving wedges 70 as the drive member 24 is forced through its wobbly motion by the actuating member 22. The number of such engageable faces 76 differs from the number of wedges 70 by one. As shown in FIG. 4, fifteen engageable faces 76 or the equivalent thereof are provided at the interior end face 78 of the driven wheel 26.

In providing the engageable faces 76 which receive the driving force from the wedges 70 the invention arranges the driven wheel 26 so that it has fifteen sockets 80 which are adapted to receive the wedges 70 consecutively as the driving member 24 is forced through its wobbly motion. Between the sockets are spoke-like portions of the wheel 26, which are labelled 26c. The back walls of the sockets 80 are designated 26b. For the purpose of reducing friction, the engageable faces 76 of the rotary driven member 26 are constituted as anti-friction parts or roller bearings 84, such bearings being preferably tapered and being held captive in continuous or endless tracks comprising grooves 86 and 88 disposed in the peripheral portion of the driven member 26. The grooves or tracks 86, 88 are fully or completely occupied by the tapered rollers 84, as may be readily understood from an inspection of FIG. 5. Thus, as each wedge 70 in succession advances into a recess 80 of the driven member 26 the wedge will engage the roller bearings 84 during movement along an arcuate path or zone of engagement or cooperation, and will advance the entire group of bearings in the endless tracks containing it. By virtue of the differential in the number of driving wedges 70 and number of recesses 80 containing the tapered roller bearings 84, the cyclic wobbly motion of the drive member 24 will effect a rotary advance of the driven member 26. Each time that any one particular wedge 70 has a forward or advancing movement it will enter a socket 80 which is next to the socket which the said wedge had previously entered. Thus, the advancing movement of the driven wheel 26 is effected in response to the wobbly motion of the driving member 24 and in response to the much faster turning motion of the actuating wheel 22. With sixteen wedges 70 being employed and fifteen sockets 80, one complete revolution of the input shaft 10 will effect 1/16 of a revolution of the output shaft 12, and accordingly the speed ratio of the transmission shown is such that a reduction of 16 to 1 is effected, between the input and output shafts.

As seen in FIGS. 4 and 5, the sockets 80 of the member 26 comprise clearance spaces. Where the said arcuate zone of cooperation exists (at the upper portion of FIG. 1) portions 80a of the clearance spaces 80 are common, as clearance spaces, to both the member 26 and the member 24. The existence of such common spaces is important in enabling proper movements of the teeth 70 to be had without interference, or jamming of the transmission.

By virtue of the wedges 70 having symmetrically disposed sloping faces 72 and 74, and by virtue of the symmetry of the tracks 86, 88 the direction of rotation of the transmission is reversible, as will be readily understood.

FIGS. 6 and 7 are diagrammatic representations of the main components of the transmission, and the various arrows shown in these figures indicate the turning and wobbly movements of these parts as above described, and also the forces experienced and directions of the same.

It will be seen from the foregoing that there has been provided by the present invention a novel and advantageous speed-reduction type mechanical transmission which effects a relatively great ratio of speeds and obviates to the greatest possible extent frictional forces and losses. The transmission involves relatively few main moving components and enables a high-ratio of speed reduction to be had between two shafts which are aligned with each other. Engageable parts of the transmission have associated with them the anti-friction bearing means whereby frictional forces, heat and wear are reduced to an absolute minimum. Moreover, the entire transmission may be run in a bath of lubricant, if desired, to insure proper and complete lubrication of the engaging surfaces. The transmission is capable of handling appreciable amounts of power, and a number of transmissions may be connected in series, to effect a great reduction in speed. The transmissions may also be parallel-operated, due to the positive drive and absence of slippage of the drive. The operation of the transmission involves simple, mechanical movements which have been time proved and tested, and accordingly the operation is foolproof, and the transmission may be expected to have a long useful life, with a minimum of servicing being required.

Variations and modifications may be made within the scope of the claims and portions of the improvement may be used without others.

I claim:

1. In a mechanical transmission, a rotary driven member having parts comprising a set of spaced, driven faces carried by it and disposed in a circle along its periphery; a non-turning driving member directly cooperable with the driven member and having parts comprising a set of spaced inclined driving faces carried by it and also disposed in a circle along its periphery, said driving faces being adapted to cooperate with the said driven faces at an arcuate zone of cooperation, the number of driving faces differing from the number of driven faces and said parts of the driven and driving members being spaced on said members in said circles and being separated by clearance spaces which are located between the driving and driven faces; a stationary frame on which the said members are mounted; means including an anti-friction device having portions interposed between the frame and the driving faces of the driving member, providing a direct-action load carrier experiencing substantially wholly compression and extending substantially directly from the driving faces to the frame, for imparting an accurate orderly cyclic wobbly motion without rotation to the driving member to cause sequential cooperation between the faces of the said sets whereby the driven member is rotatably advanced as the driving member wobbles without rotation; said parts of one of said members comprising fixed portions and anti-friction roller bearing means, said roller bearing means comprising roller elements movable around said fixed portions and drivingly engageable with the said parts of the other member, said driving engagement effecting the rotary advance of the driven member and constituting a direct interaction between the said members.

2. A transmission as in claim 1, in which the said one member has endless tracks, and in which the roller elements are disposed in said tracks and movable therealong.

3. A transmission as in claim 2, wherein there are radial spokes on the said one member, constituting the said fixed portions, said roller elements being movable around said spokes.

4. A transmission as in claim 1, wherein the said one member has endless tracks, and wherein the roller elements are disposed in said tracks and movable therealong, said roller elements being adapted to roll with rotation always in one direction in response to forces exerted on them by the said driving faces.

5. A transmission as in claim 1, wherein:
(a) the means for imparting cyclic wobbly motion comprises a backing wheel having opposite faces inclined with respect to each other,
(b) said anti-friction device comprising rollers engaged with the said faces and with the frame and driving member.

6. A transmission as in claim 5, wherein:
(a) one of the faces of the backing wheel is normal to the axis thereof.

7. A transmission as in claim 6, wherein:
(a) the driving member comprises a wheel having substantially the same diameter as the backing wheel.

8. A transmission as in claim 7, wherein:
(a) the driven member comprises a wheel having substantially the same diameter as those of the driving and backing wheels.

9. A transmission as in claim 8, wherein:
(a) the anti-friction device comprises races of diameter commensurate with the diameters of the driving and backing wheels,
(b) an anti-friction device is provided between the frame and driven wheel, having a race of diameter commensurate with the first-mentioned races.

References Cited in the file of this patent

UNITED STATES PATENTS 2,874,594     Sundt _____ Feb. 24, 1959

FOREIGN PATENTS 174,873     Great Britain _____ Feb. 9, 1922
380,787     Germany _____ Sept. 12, 1923